(12) United States Patent
Bielefeld et al.

(10) Patent No.: US 6,400,949 B1
(45) Date of Patent: Jun. 4, 2002

(54) PROCESS FOR ESTABLISHING TELECOMMUNICATION CONNECTIONS BETWEEN TELECOMMUNICATION APPARATUSES IN WIRELESS TELECOMMUNICATION SYSTEMS, IN PARTICULAR BETWEEN DECT-APPARATUSES OF A DECT-SYSTEM

(75) Inventors: Ludger Bielefeld, Bocholt; Christoph Lenfort, Nordwalde, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/230,493

(22) PCT Filed: Aug. 5, 1997

(86) PCT No.: PCT/DE97/01648

§ 371 (c)(1),
(2), (4) Date: Jan. 22, 1999

(87) PCT Pub. No.: WO98/07245

PCT Pub. Date: Feb. 19, 1998

(30) Foreign Application Priority Data

Aug. 9, 1996 (DE) .......................................... 198 32 261

(51) Int. Cl.$^7$ ................................................ H04Q 7/20

(52) U.S. Cl. ........................................ 455/434; 455/465

(58) Field of Search ................................. 455/434, 422, 455/510, 517, 462, 465, 62; 370/347

(56) References Cited

FOREIGN PATENT DOCUMENTS

| DE | 44 47 243 A1 | 7/1996 |
| EP | 0 717 578 A2 | 6/1996 |
| EP | 0 722 259 A2 | 7/1996 |
| GB | 2 295 944 A | 6/1996 |
| GB | 2 297 014 A | 7/1996 |
| WO | WO 93/21719 | 10/1993 |
| WO | WO 94/10764 | 5/1994 |
| WO | WO 95/05040 | 2/1995 |

OTHER PUBLICATIONS

IEEE Communications Magazine, Jan. 1995, David D. Falconer et al, Time Division Multiple Access Methods Personal Communications, pp. 50–57.

DECT/GAP standard (Digital European Cordless Telecommunication; cf. (1): Nachrichtentechnik Elekronik 42 (1992) Jan./Feb. No. 1, Berlin, DE; U. Pilger "Struktur des DECT–Standards," pp. 23–29.

Telcom Report 16 (1993), No. 1, J. H. Koch: "Digitaler Komfort für schnurlose Telekommunikation—DECT–Standard eröffmet neue Nutzungsgebiete", pp. 26–27.

tec 2/93—Das technische Magazin von Ascom "Wege zur universellen mobilen Telekommunikation", pp. 35 to 42.

Philips Telecommunication Review, R. J. Mulder, "DECT, a universal cordless access system", pp. 68–73.

Components 31 (1993), No. 6, S. Althammer, D. Brückmann: Hochoptimierte IC's für DECT–Schnurlostelefone, pp. 215–218.

Unterrichtsblätter—Deutsche Telekom Jg., 48 Feb.1995, Protokolle am Beispiel des OSI–Referenzmodells, pp. 102–111.

(List continued on next page.)

Primary Examiner—Nguyen T. Vo
(74) Attorney, Agent, or Firm—Bell, Boyd & Lloyd LLC (57) ABSTRACT

In order to set up telecommunication connections more quickly between a DECT fixed part and a DECT mobile part (portable part) of a DECT system, if no items of "blind slot" information relating to the telecommunication connections to be set up are present, and to increase the probability that a connection setup takes place given these conditions, the DECT radio channels used in failed attempts at setting up the telecommunication connections are marked, at least temporarily, as unusable radio channels for further connection setup attempts.

12 Claims, 8 Drawing Sheets

OTHER PUBLICATIONS

Nachrichtentec, Elektron, Berlin, vol. 45 (1995), Roland Geissler, Drahtlose ISDN–Kommunikation, pp. 21–23.

Nachrichtentech, Elektron, Berlin, vol. 45, (1995), Radio in the Local Loop, pp. 29–30.

IEE Colloquium 1993, 173; W. Hing et al, "Cordless Access to the ISDN Basic Rate Service", pp. 29/1–29/7.

ETSI—Publication prETS 300xxx, Version 1.10, Sep. (1996), pp. 1–117.

Nachrichtentech, Elektron, Berlin, vol. 41, (1991) Werner Baerwald, "Schnittstellen in der Tele–kommunikation Teil 1: Standardisierung in der Telekommunikation—ein Überlick", pp. 99–102; Teil 2: pp. 138–143; Teil 3: pp. 179–182; Teil 3 (Schluss): pp. 219–222; Teil 4: pp. 19–20; Teil 5: pp. 59–61; Teil 5 (Schluss): pp. 99–102; Teil 6: pp. 150–153; Teil 7: pp. 238–241; Teil 8: pp. 29–33; Teil 9: pp. 95–97; Teil 9: pp. 129–135; & Teil 10: pp. 187–190.

Informatik Spektrum 14, Jun. 1991, No. 3, Berlin, A. Mann, "Der GSM–Standard—Grundlage für dugutake europäische Mobilfunknetze", pp.137–152.

ETSI—Publication, Oct. 1992, ETS 300175 1 . . . 9, Part 1: Overview, pp. 1–30; Part 2: Physical layer pp. 1–39; Part 3: Medium acces control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

ETSI—Publication, Apr. 1995, prETS 300444, Generic Access Profile, pp.1–129.

PROCESS FOR ESTABLISHING TELECOMMUNICATION CONNECTIONS BETWEEN TELECOMMUNICATION APPARATUSES IN WIRELESS TELECOMMUNICATION SYSTEMS, IN PARTICULAR BETWEEN DECT-APPARATUSES OF A DECT-SYSTEM

In messaging systems with a message transmission path between a message source and a message destination, transmission and receiving apparatuses are used for message processing and transmission. Such apparatuses have the following features:

1) the message processing and message transmission can take place in a preferred direction of transmission (simplex operation) or in both directions of transmission (duplex operation),
2) the message processing is analog or digital,
3) the message transmission takes place in wireless fashion on the basis of various message transmission methods FDMA (Frequency Division Multiple Access), TDMA (Time Division Multiple Access) and/or CDMA (Code Division Multiple Access)—e.g. according to radio standards such as DECT, GSM, WACS or PACS, IS-54, PHS, PDC, etc. [cf. IEEE Communications Magazine, January 1995, pages 50 to 57; D. D. Falconer et al.: "Time Division Multiple Access Methods for Wireless Personal Communications"] and/or in wire-bound fashion.

"Message" is a higher-order concept that stands both for the meaning content (information) and for the physical representation (signal). Despite identical meaning content of a message—i.e., identical information—different signal forms can occur. Thus, for example a message relating to a single subject matter can be transmitted in the following forms:

(1) an image,
(2) as spoken word,
(3) as written word,
(4) as encrypted word or image.

The type of transmission according to forms (1), (2) and (3) is thereby normally characterized by continuous (analog) signals, while in the transmission type according to form (4) discontinuous signals (e.g. impulses, digital signals) usually arise.

On the basis of this general definition of a messaging system, the invention relates to a method for the setting up of telecommunication connections between telecommunication apparatuses in wireless telecommunication systems, in particular between DECT apparatuses of a DECT system Telecommunication systems of the type defined above are for example DECT systems (Digital Enhanced (formerly: European) Cordless Telecommunication; cf. (1): Nachrichtentechnik Elektronik 42 (1992) Jan./Feb. no. 1, Berlin, DE; U. Pilger, "Struktur des DECT-Standards," pp. 23 to 29, in connection with the ETSI publication ETS 300175-1 . . . 9, Oct. 1992; (2): Telcom Report 16 (1993), no. 1, J. H. Koch: "Digitaler Komfort für schnurlose Telekommunikation—DECT-Standard eröffnet neue Nutzungsgebiete," pp. 26 and 27; (3): tec 2/93—Das technische Magazin von Ascom "Wege zur universellen mobilen Telekommunikation," pp. 35 to 42; (4): Philips Telecommunication Review, vol. 49, no. 3, Sep. 1991, R. J. Mulder: "DECT, a universal cordless access system"; (5): WO 93/21719 (FIGS. 1 to 3 with associated specification)) or GAP systems (Generic Access Profile; ETSI publication prETS 300444, April 1995, Final Draft, ETSI, FR), which can for example be constructed according to the representation in FIG. 1.

Figure 1:
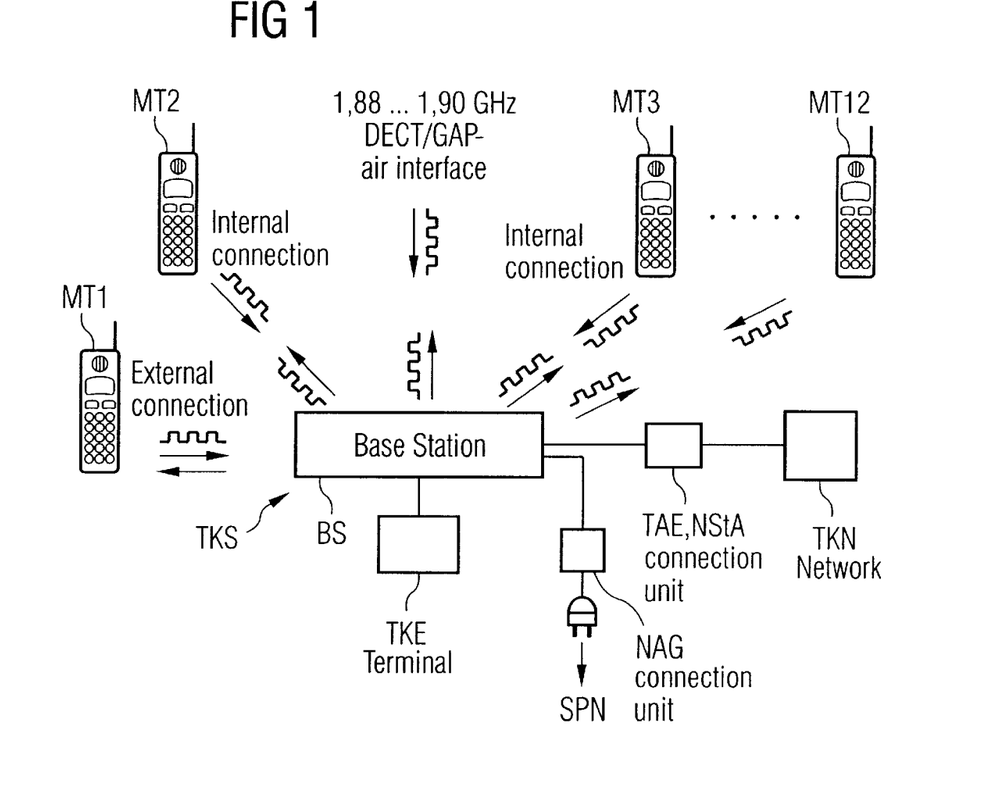
FIG. 1 depicts a telecommunication system such as a DECT system.

According to the DECT/GAP standard, according to the representation in FIG. 1 a maximum of 12 connections can be set up in parallel to DECT/GAP mobile parts MT1 . . . MT12 according to the TDMA/FDMA/TDD method (Time Division Multiple Access/Frequency Division Multiple Access/Time Division Duplex) via a DECT/GAP air interface designed for the frequency range between 1.88 and 1.90 GHz. The number 12 results from a number "k" of time slots or, respectively, telecommunication channels available for the duplex operation of a DECT/GAP system (k=12). The connections can thereby be internal and/or external. Given an internal connection, two mobile parts registered at the base station BS, e.g. the mobile part MT2 and the mobile part MT3, can communicate with one another. For the setup of an external connection, the base station BS is connected with a telecommunication network TKN, e.g. in wire-bound form via a telecommunication terminal unit TAE or, respectively, a private branch exchange NStA with a wire-bound telecommunication network or, according to WO 95/05040, in wireless form as a repeater station with a higher-level telecommunication network. Given the external connection, it is possible using a mobile part, e.g. the mobile part MT1, to communicate with a subscriber in the telecommunication network TKN via the base station BS, the telecommunication terminal unit TAE or, respectively, private branch exchange NStA. If—as in the case of the Gigaset 951 (Siemens cordless telephone; cf. telcom report 16, (1993), vol. 1, pages 26 and 27—the base station BS has only one terminal to the telecommunication terminal unit TAE or, respectively, to the private branch exchange NStA, only one external connection can be set up. If—as in the case of the Gigaset 952 (Siemens cordless telephone; cf. telcom report 16, (1993), vol. 1, pages 26 and 27—the base station has two terminals to the telecommunication network TKN, then in addition to the external connection with the mobile part MT1 a further external connection is possible from a wire-bound telecommunication terminal apparatus TKE connected to the base station BS. It is thereby also conceivable in principle that instead of the telecommunication terminal apparatus TKE a second mobile part, e.g. the mobile part MT12, uses the second terminal for an external connection. While the mobile parts MT1 . . . MT12 are operated with a battery or an accumulator, the base station, fashioned as a wireless small switching installation, is connected to a voltage network SPN via a network terminal apparatus NAG.

Figure 2:
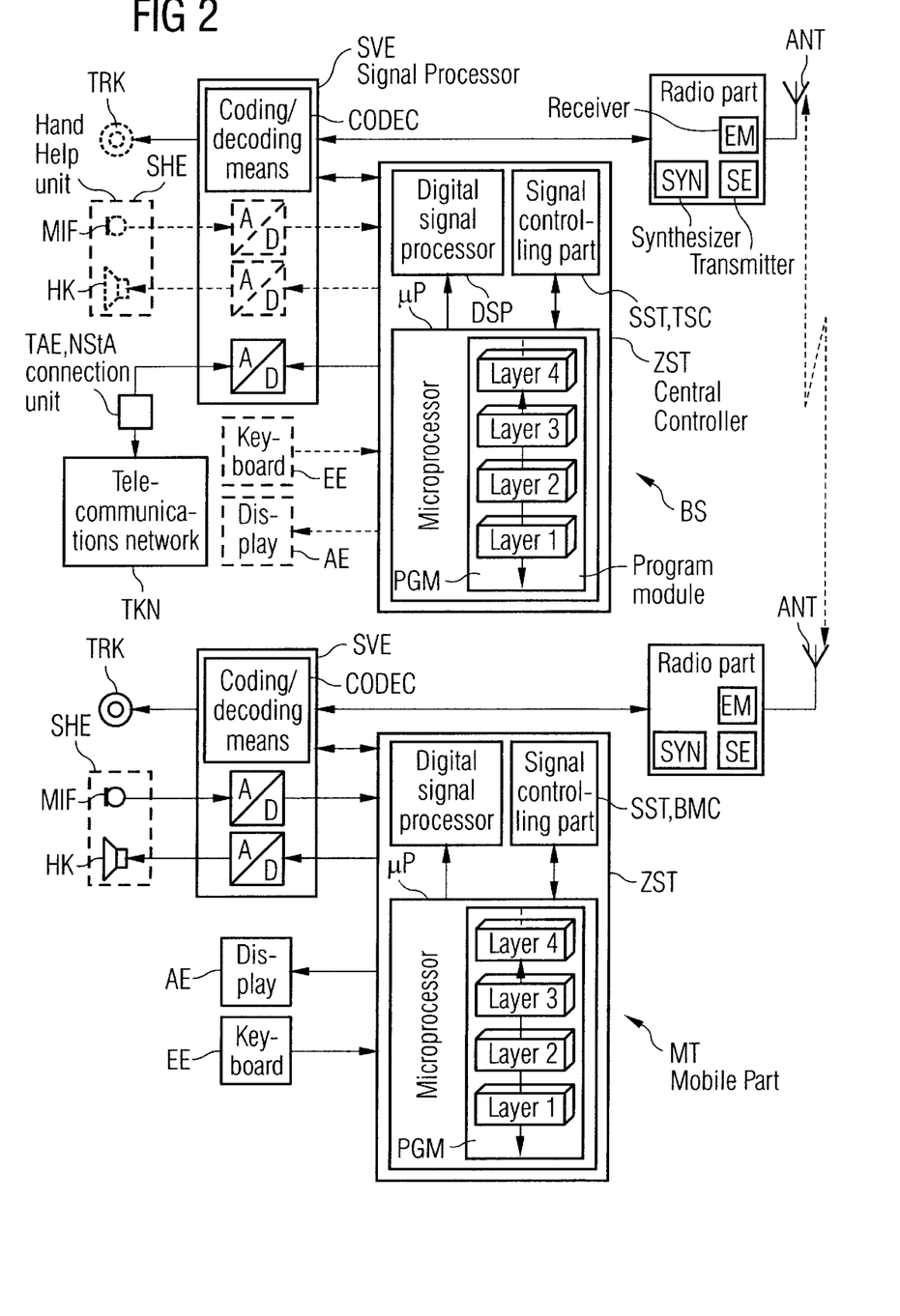
FIG. 2 is a block diagram of a base station and a mobile part.

FIG. 2 shows, based on the reference Components 31 (1993), vol. 6, pp. 215 to 218; S. Althammer, D. Brückmann: "Hochoptimierte IC's für DECT-Schnurlostelefone," the circuit design of the base station BS and of the mobile part MT. The base station BS and mobile part MT accordingly comprise a radio part FKT having an antenna ANT allocated for transmission and reception of radio signals, a signal processing means SVE and a central control unit ZST that are connected with one another in the manner shown. The radio part FKT essentially contains the known means such as transmitter SE, receiver EM and synthesizer SYN. In the signal processing means SVE, among other things there is a coding/decoding means CODEC. The central control unit ZST comprises, both for the base station BS and for the mobile part MT, a microprocessor $\mu P$ with a program module PGM constructed according to the OSI/ISO layer model (cf. (1): Unterrichtsblätter—Deutsche Telekom, vol. 48, Febuary 1995, pp. 102 to 111; (2) ETSI publication ETS 300175-1 . . . 9, October 1992), a signal control part SST and a digital signal processor DSP that are connected with one another in the manner shown. Of the layers defined in the layer model, only the first four layers, immediately essential for the base station BS and the mobile part MT, are shown. The signal control part SST is fashioned in the base station BS as a time switch controller TSC and in the mobile part MT as a burst mode controller BMC. The essential difference between the two signal control parts TSC, BMC is that the base-station-specific signal control part TSC takes over additional switching functions in comparison with the mobile-part-specific signal control part BMC.

The manner of functioning in principle of the switching units described above is for example specified in the above-cited reference Components 31 (1993), no. 6, pp. 215–218.

The specified circuit design according to FIG. 2 is supplemented with additional functional units in the base station BS and the mobile part MT, in accordance with their function in the DECT/GAP system according to FIG. 1.

The base station BS is connected with the telecommunication network TKN via the signal processing means SVE and the telecommunication terminal unit TAE or, respectively, the private branch exchange NStA. As an option, the base station BS can also comprise an operator interface (functional units drawn in with broken lines in FIG. 2), which consists for example of an input means EE fashioned as a keyboard, a display means AE fashioned as a display, a speaking/hearing means SHE fashioned as a hand apparatus with microphone MIF and earpiece HK, and a tone call bell TRK.

The mobile part MT comprises the operator interface, possible as an option in the base station BS, with the above-described operating elements belonging to this operator interface.

Figure 3:
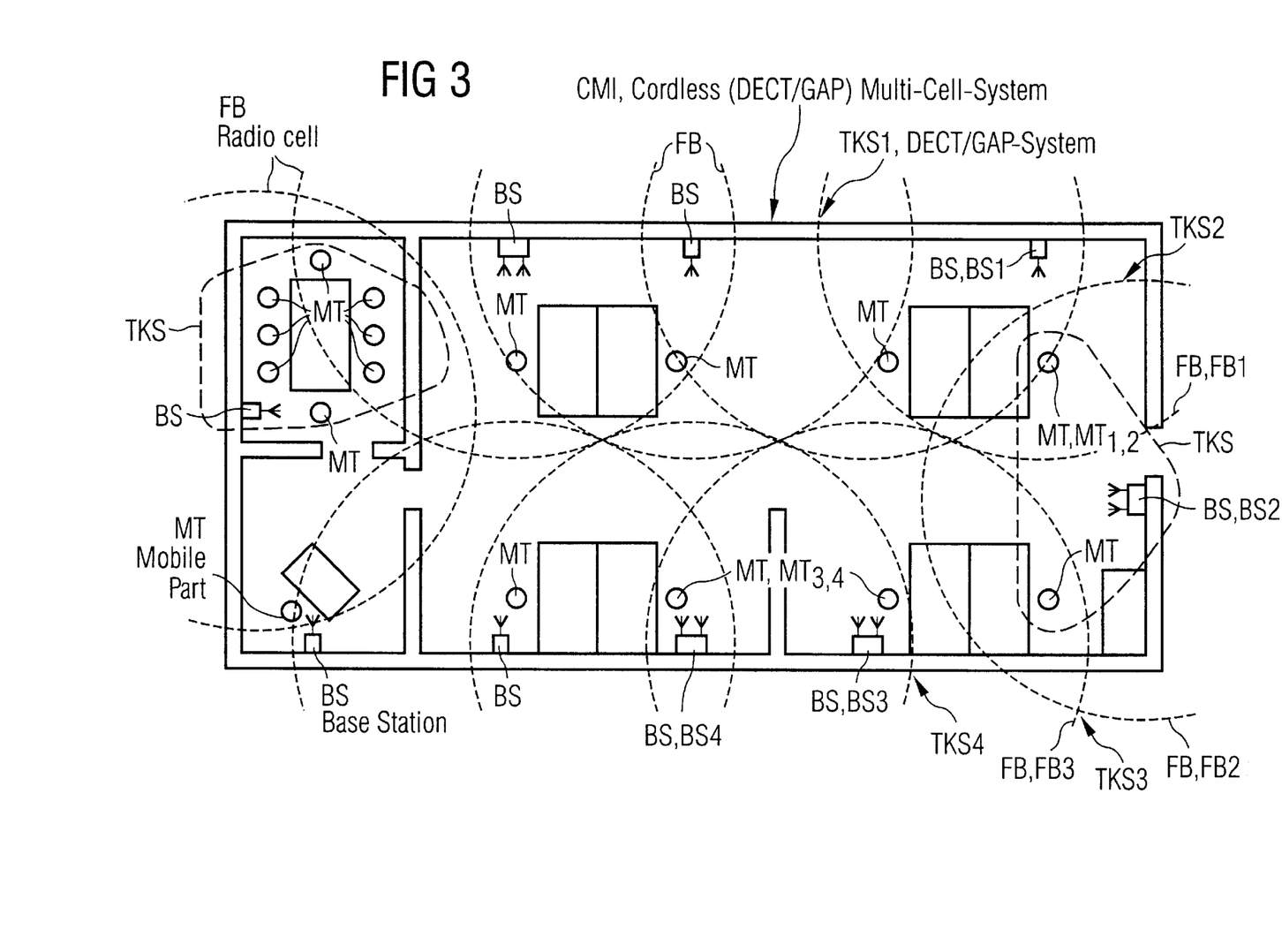
FIG. 3 depicts a cellular DECT/GAP multi-system.

FIG. 3 shows, on the basis of the DECT system according to FIG. 1, a cellular DECT/GAP multisystem CMI (Cordless Multicell Integration), in which several of the above-described DECT/GAP systems TKS are present in concentrated fashion (in the sense of a "hot spot" arrangement), with a respective base station BS and one/several mobile part/s MT, at an arbitrary geographical location, e.g. in an administration building with spacious floor offices. However, instead of a "closed" geographical location, such as the management building, an "open" geographical location with strategic telecommunication significance, e.g. squares in large cities with high traffic volume, a large concentration of commercial units, and a large amount of movement of persons is possible for the installation of a cellular DECT/GAP multisystem CMI. A portion of the base stations BS arranged in the large-space office are thereby fashioned as antenna diversity base stations, in contrast to the base stations shown in FIGS. 1 and 2, according to WO 94/10764. The concentration of the DECT/GAP systems TKS is thereby so marked (gap-free radio coverage of the geographical location) that individual DECT/GAP systems TKS operate in the same environment through the overlapping cellular DECT/GAP radio areas FB.

According to the degree of overlap, 'same environment' can thereby mean that a) a first base station BS1 of a first telecommunication system TKS1 is arranged in a first radio area FB1, and a second base station BS2 of a second telecommunication system TKS2 is arranged in a second radio area FB2, and these can set up telecommunication connections to at least one mobile part $MT_{1,2}$, b) a third base station BS3 of a third telecommunication system TKS3 and a fourth base station BS4 of a fourth telecommunication system TKS4 are arranged in a common third radio area FB3, and these can set up telecommunication connections to at least one mobile part $MT_{3,4}$.

Figure 4:
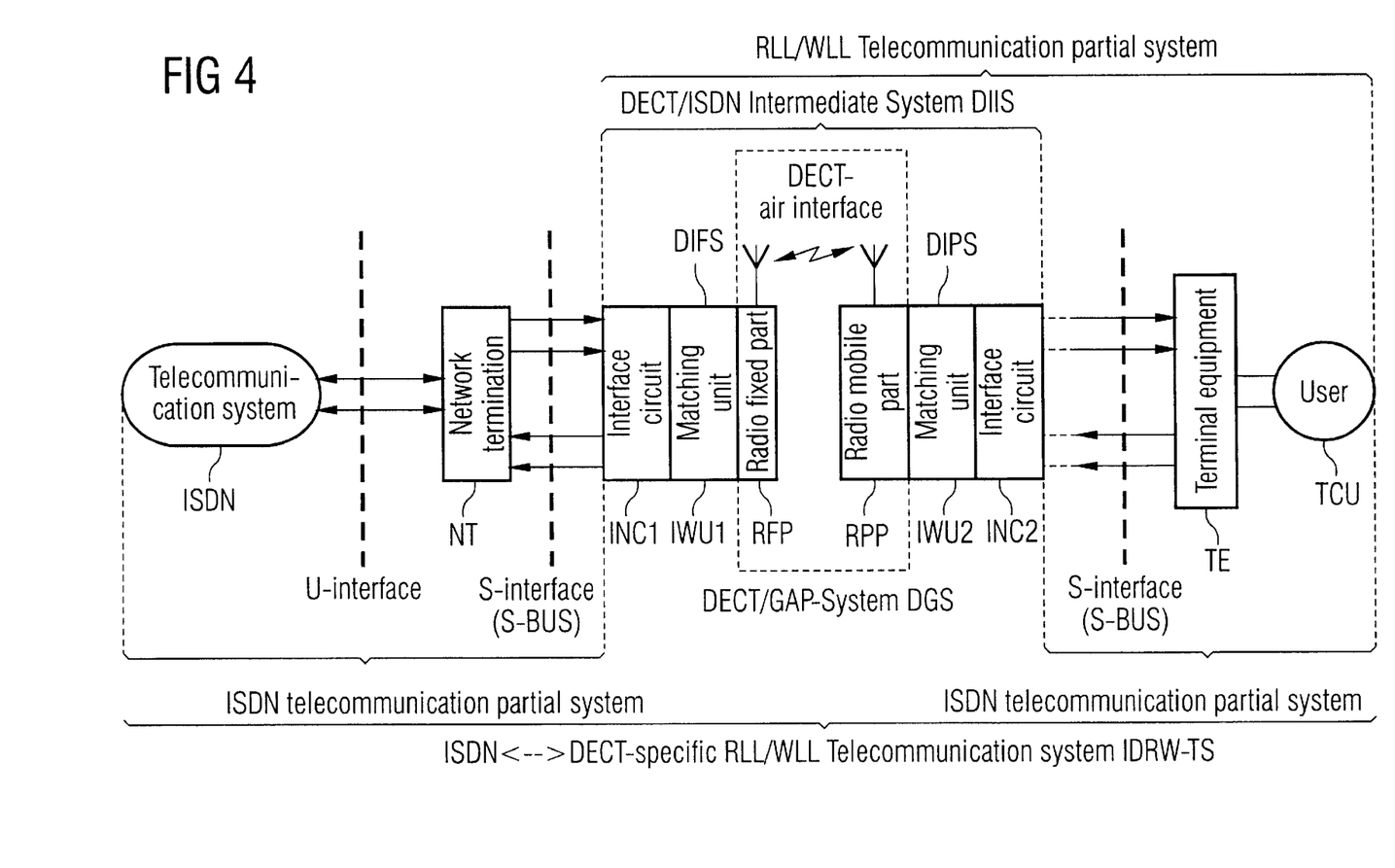
FIG. 4 depicts a DECT specific RLL/VLL telecommunication partial system.

FIG. 4 shows, on the basis of the references "Nachrichtentechnik Elektronik, Berlin 45, (1995), vol. 1, pp. 21 to 23 and vol. 3, pp. 29 and 30," as well as IEE Colloquium 1993, 173; (1993), pp. 29/1–29/7; W. Hing, F. Halsall: "Cordless access to the ISDN basic rate service," on the basis of a DECT/ISDN Intermediate Systems DIIS according to the ETSI publication prETS 300xxx, version 1.10, September 1996, a "ISDN⇋DECT-specific RLL/WLL" Telecommunication System IDRW-TS (Integrated Services Digital Network⇋Radio in the Local Loop/Wireless in the Local Loop) with an ISDN Telecommunication Partial System I-TTS (cf. reference "Nachrichtentechnik Elektronik, Berlin 41–43, Part: 1 to 10, T1: (1991) vol. 3, pp. 99 to 102; T2: (1991) vol. 4, pp. 138 to 143; T3: (1991) vol. 5, pp. 179 to 182 and vol. 6, pp. 219 to 220; T4: (1991) vol. 6, pp. 220 to 222 and (1992) vol. 1, pp. 19 to 20; T5: (1992) vol. 2, pp. 59 to 62 and (1992) vol. 3, pp. 99 to 102; T6: (1992) vol. 4, pp. 150 to 153; T7: (1992) vol. 6, pp. 238 to 241; T8: (1993), vol. 1, pp. 29 to 33; T9: (1993) vol. 2, pp. 95 to 97 and (1993) vol. 3, pp. 129 to 135; T10: (1993) vol. 4, pp. 187 to 190;") and a DECT-specific RLL/WLL Telecommunication Partial System RW-TTS.

The DECT/ISDN Intermediate System DIIS or, respectively, the RLL/WLL telecommunication partial system RW-TTS is thereby preferably based on a DECT/GAP System DGS, as shown for example in FIG. 1.

The DECT/ISDN intermediate system DIIS or, respectively, the RLL/WLL telecommunication partial system RW-TTS can alternatively also be based on a GSM (Groupe Spéciale Mobile or Global System for Mobile Communication; cf. Informatik Spektrum 14 (1991) June, no. 3, Berlin, DE; A. Mann: "Der GSM-Standard —Grundlage für digitale europäische Mobilfunknetze," pp. 137 to 152). Instead of this, in the context of a hybrid telecommunication system it is also possible for the ISDN telecommunication partial system I-TTS to be fashioned as a GSM system.

In addition, the systems mentioned above, as well as future systems based on the known multiple access methods FDMA, TDMA, CDMA (Frequency Division Multiple Access, Time Division Multiple Access, Code Division Multiple Access), and hybrid multiple access methods formed herefrom, are further possibilities for the realization of the DECT/ISDN intermediate system DIIS or, respectively, of the RLL/WLL telecommunication partial system RW-TTS, or of the ISDN telecommunication partial system I-TTS.

The use of radio channels (e.g. DECT channels) in classical wire-bound telecommunication systems such as ISDN is increasingly important, in particular against the background of future alternative network operators without a separate complete wired network.

Thus, e.g. in the RLL/WLL telecommunication partial system RW-TTS, the wireless terminal technology RLL/WLL (Radio in the Local Loop/Wireless in the Local Loop), ISDN services at standard ISDN interfaces are to be made available to the ISDN subscriber (cf. FIG. 4), for example with the integration of the DECT system DS.

In the "ISDN⇋DECT-specific RLL/WLL" telecommunication system IDRW-TS according to FIG. 4, a telecommunication subscriber (user) TCU (TeleCommunication User) with his terminal apparatus TE (Terminal Endpoint; Terminal Equipment) is incorporated, e.g. via a standardized S-interface (S-BUS), the DECT/ISDN intermediate system DIIS (first telecommunication system), fashioned as a local message transmission loop (preferably DECT-specific and contained in the RLL/WLL telecommunication partial system RW-TTS), a further standardized S-interface (S-BUS), a network terminal NT (Network Termination) and a standardized U-interface of the ISDN telecommunication partial system I-TTS (second telecommunication partial system), into the ISDN world with the services available therein.

The first telecommunication partial system DIIS essentially consists of two telecommunication interfaces, a first telecommunication interface DIFS (DECT Intermediate Fixed System) and a second telecommunication interface DIPS (DECT Intermediate Portable System), which are connected with one another in wireless fashion, e.g. via a DECT air interface. Due to the quasi-stationary first telecommunication interface DIFS, the first telecommunication partial system DIIS forms the local message transmission loop defined above in this context. The first telecommunication interface DIFS contains a radio fixed part RFP, a matching unit IWU1 (InterWorking Unit), and an interface circuit INC1 (INterface Circuitry) to the S-interface. The second telecommunication interface DIPS contains a radio mobile part RPP (Radio Portable Part) and a matching unit IWU2 (InterWorking Unit) and an interface circuit INC2 (INterface Circuitry) to the S-interface. The radio fixed part RFP and the radio mobile part RPP thereby form the known DECT/GAP system DGS.

Figure 5:
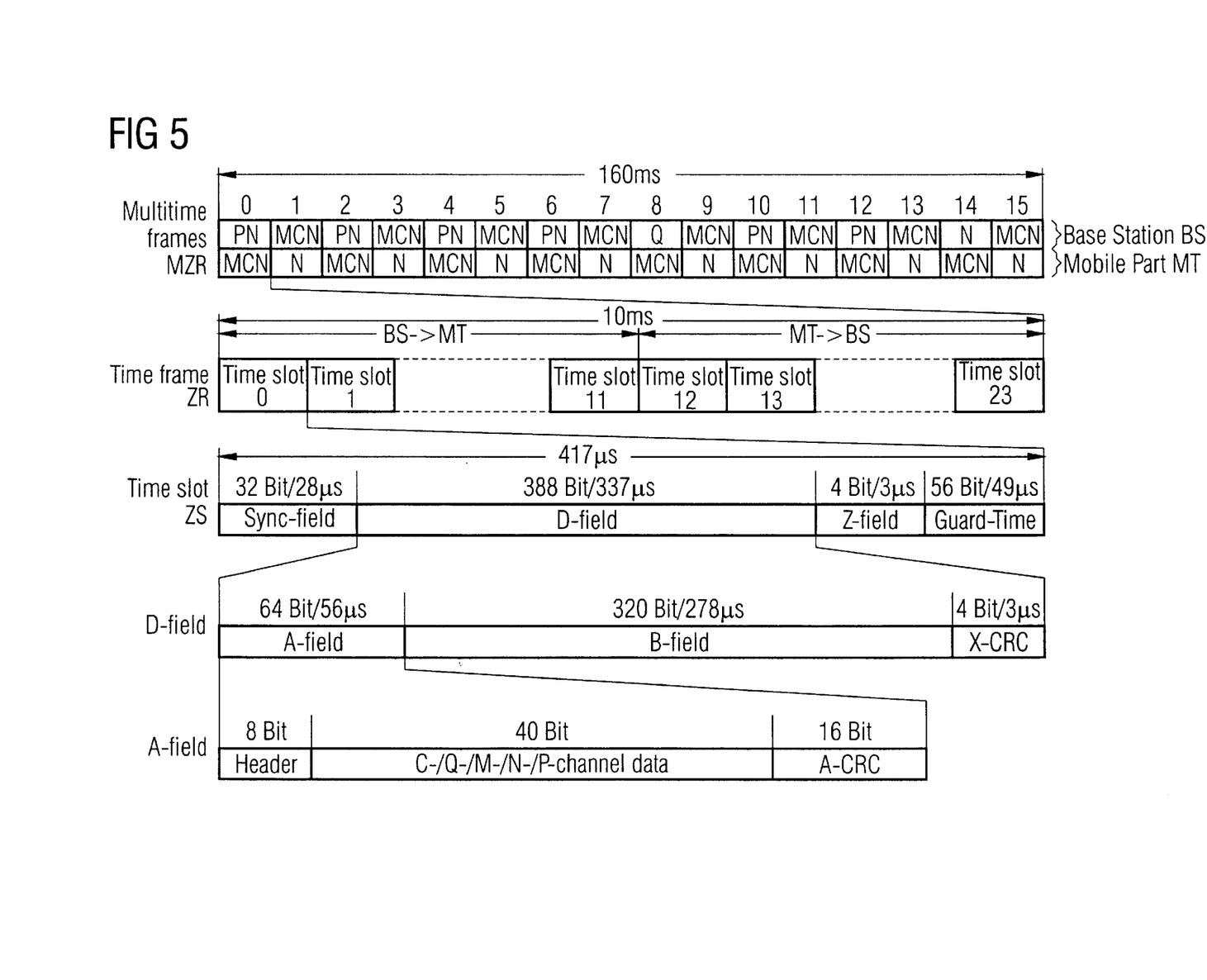
FIG. 5 depicts a TDMA structure of the DECT/GAP system.

FIG. 5 shows, with reference to the publication "Nachrichtentechnik Elektronik 42 (1992) Jan./Feb., no. 1, Berlin, DE; U. Pilger: "Struktur des DECT-Standards," pp. 23 to 29, in connection with ETS 300 175-1 . . . 9, October 1992,"the TDMA structure of the DECT/GAP system TKS. The DECT/GAP system is a hybrid system with respect to the multiple access methods, in which, according to the FDMA principle, transmission of radio messages according to the TDMA principle according to FIG. 5 can take place on ten frequencies in the frequency band between 1.88 and 1.9 GHz, in a predetermined chronological sequence from the base station BS to the mobile part MT and from the mobile part MT to the base station BS (Time Division Duplex operation). The chronological sequence is thereby determined by a multi-time slot MZR that occurs every 160 ms and that comprises 16 time slots ZR with a respective time duration of 10 ms. In these time slots ZR, items of information that relate to a C-, M-, N-, P-, Q-channel defined in the DECT standard are sent separately to the base station BS and the mobile part MT. If in a time slot ZR items of information for several of these channels are transmitted, the transmission takes place according to a priority list with M>C>N and P>N. Each of the 16 time slots ZR of the multi-time slot MZR is in turn divided into 24 time slots ZS with a respective time duration of 417 μs, of which 12 time slots ZS (time slots 0 . . . 11) are intended for the transmission direction "base station BS→mobile part MT" and a further 12 time slots ZS (time slots 12 . . . 23) are intended for the transmission direction "mobile part MT→base station BS." In each of these time slots ZS, items of information are transmitted according to the DECT standard with a bit length of 480 bits. Of these 480 bits, 32 bits are transmitted as synchronization information in a SYNC field, and 388 bits are transmitted as useful information in a D-field. The remaining 60 bits are transmitted as additional items of information in a Z-field and as protective items of information in a field "guard time." The 388 bits, transmitted as items of useful information, of the D-field are in turn divided into a 64-bit-long A-field, a 320-bit-long B-field and a 4-bit-long "X-CRC" word. The 64-bit-long A-field is composed of an 8-bit-long data head (header), a 40-bit-long data set with data for the C-, Q-, M-, N-, P-channels, and a 16-bit-long "A-CRC" word.

For the setup of telecommunication connections between the base station/s BS and the mobile parts MT in the DECT systems according to FIGS. 1 to 5, according to the DECT standard the following procedure is for example provided.

The base station BS (Radio Fixed Part RFP) according to FIGS. 1 to 5 transmits items of broadcast information via the DECT air interface at regular time intervals on simplex transmission paths, called dummy bearers, which items of information are received by the mobile part MT (Radio Portable Part RPP) according to FIGS. 1 to 5 and are used by it for synchronization and connection setup with the base station. The items of broadcast information need not necessarily be transmitted on a dummy transmission path (dummy bearer).

It is also possible for no dummy transmission path to be present, because the base station is already maintaining at least one telecommunication connection, called a traffic transmission path (traffic bearer) to a different mobile part, and on which it then transmits the required items of broadcast information. In this case, the mobile part, which may have a telecommunication connection to the base station, can receive the items of broadcast information, as in the transmission of the items of broadcast information on the dummy transmission path.

According to the ETSI publication ETS 300175-3, October 1992, chapter 9.1.1.1, the items of broadcast information contain items of information concerning access rights, items of system information and items of paging information.

In addition, the items of system information contain additional items of information that inform the mobile part as to which TDMA time slots are available at the base station. This additional information is designated as "blind slot" information or "poor channel" information in the DECT standard (ETSI publication ETS 300175-3, October 1992, ch. 11.4.1, note 4) and in the GAP standard, which is a subset of the DECT standard and which has the task of ensuring the interoperability of the DECT air interface for telephone applications (cf. ETSI publication prETS 300444, April 1995, ch. 10.3.3). The transmission of the additional information rests on the blind slot effect that occurs in TDMA-specific telecommunication systems such as the DECT system. The blind slot effect occurs in particular when a) base stations according to FIG. 2 comprise only one radio part with a transmitter and receiver, and can thus send or receive only on one frequency during a time slot; if the base station maintains a duplex radio connection in a particular time slot pair, it then cannot set up any further radio connections to other mobile parts on this time slot pair;

b) base stations according to WO 94/10811 cannot send or receive in particular time slots, due to technical restrictions (e.g. DECT base stations with a "slow hopping" radio part).

The connection setup takes place according to the rules of the channel selection (cf. ETSI publication ETS 300175-3, October 1992, ch. 11.4), according to which a new channel is selected for the setup of a new connection and a connection request (SETUP request) is transmitted. In order to prevent the mobile parts from sending request information for the setup of a connection (SETUP requests) at time slots at which the base station is not ready to receive, the base station transmits the previously mentioned blind slot information on the dummy transmission path. For example, the time slots at which the base station is ready to receive are indicated by this additional information. However, the transmission of the additional information is not provided for all base stations.

According to the GAP standard (cf. ETSI publication prETS 300444, April 1995, ch. 10.3.3), the transmission of the additional information is provided for base stations that are not ready to receive due to the above-mentioned technical restrictions (slow hopping radio part) at some time slots; however, this information must then be sent at least every 10 s according to the GAP standard.

Figure 6:
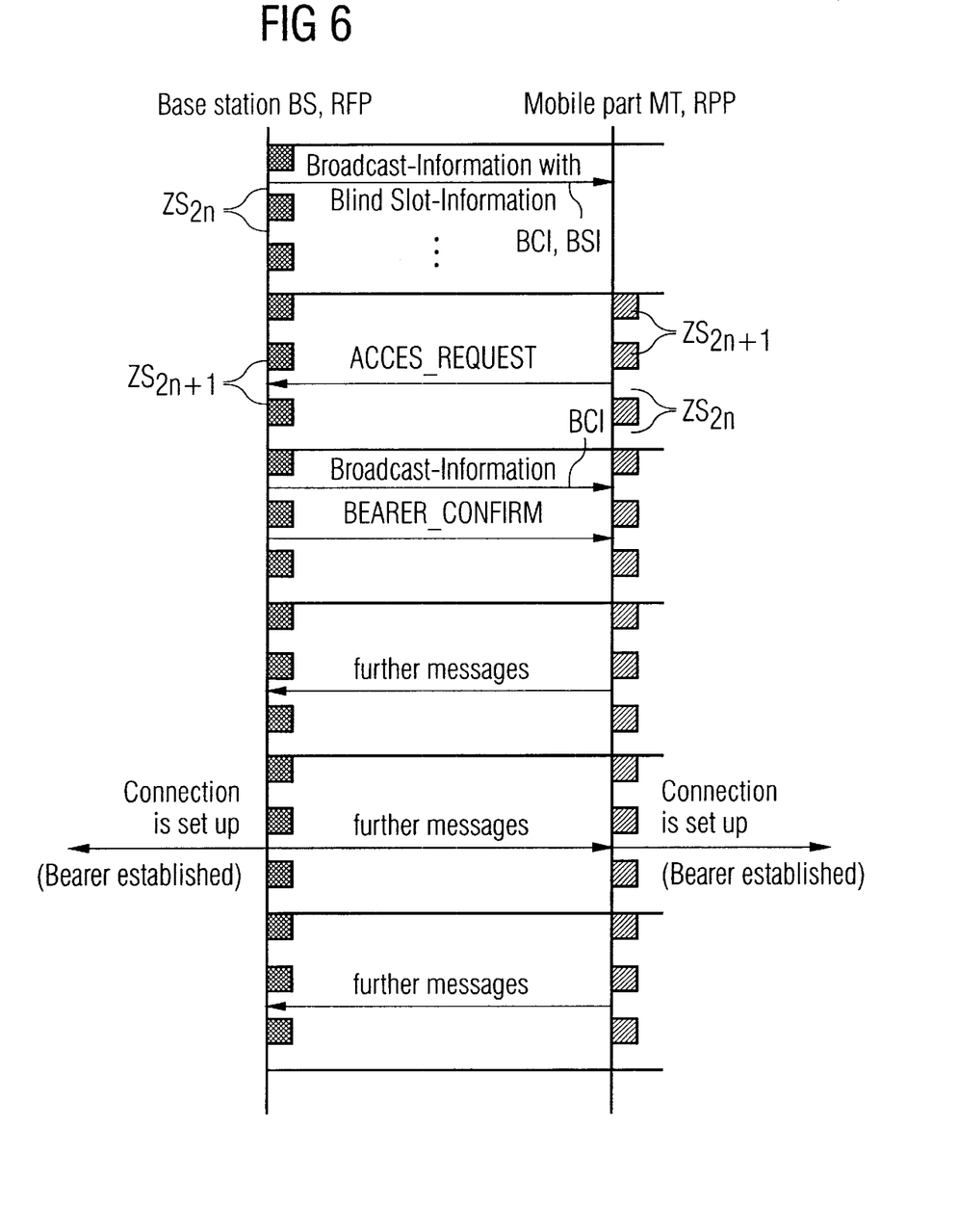
FIG. 6 depicts an event-state diagram for setting up a telecommunication connection between a base station and a mobile part.
Figure 7:
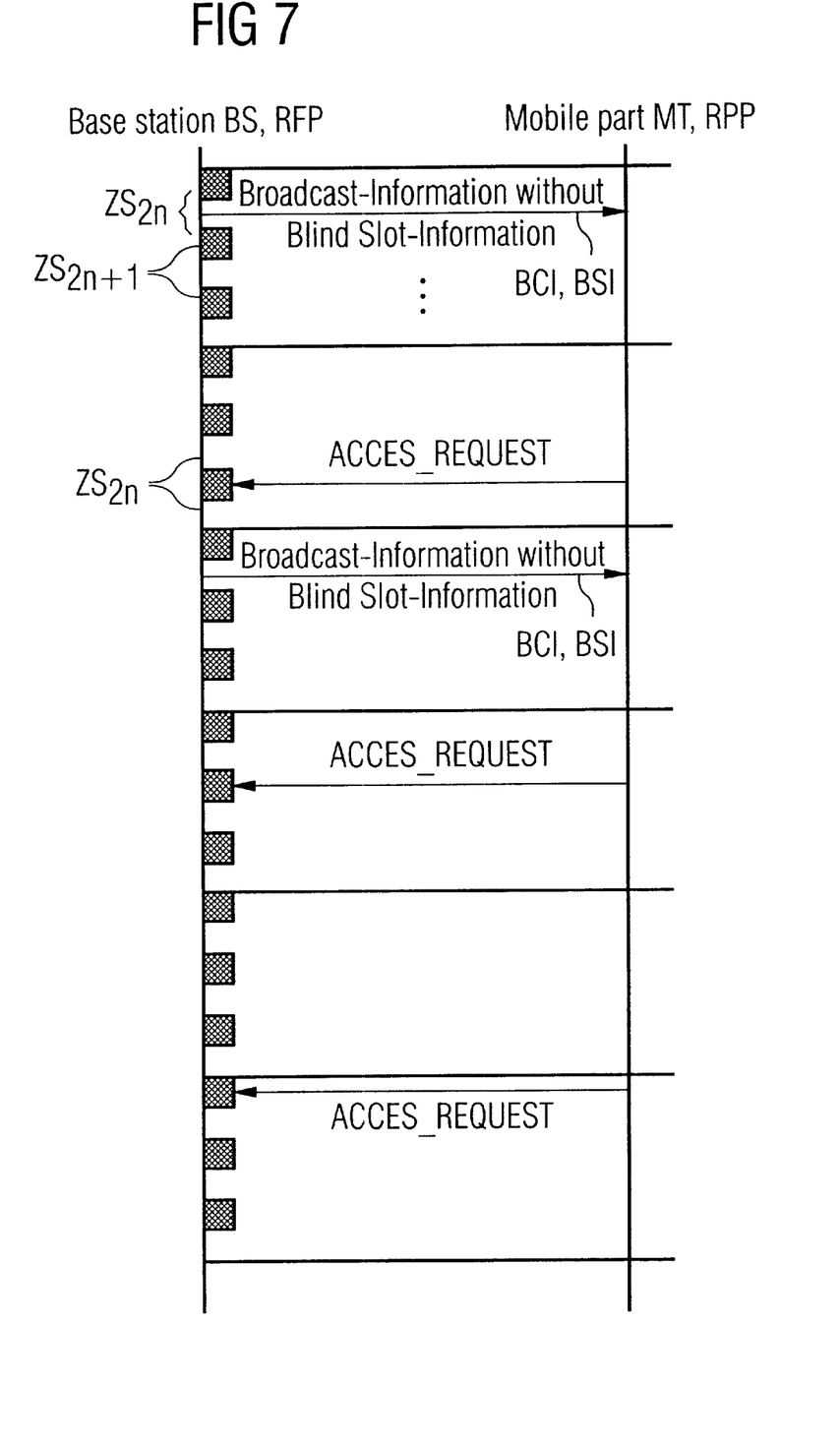
FIG. 7 depicts an event-state diagram for setting up a telecommunication connection between a base station and a mobile part without any additional information.

The significance of the additional information (blind slot information) concerning the connection setup between the base station and the mobile part of a TDMA-specific wireless telecommunication system (e.g. of a single- or multi-cell DECT system) is explained by the following DECT-specific scenario, as well as on the basis of FIGS. 6 and 7.

Immediately after the entry of a mobile part into a radio cell, the blind slot information is still not present in this mobile part. As long as this information also still has not been received by the mobile part, the mobile part proceeds on the assumption that all time slots at the base station in the radio cell can be occupied (are free). If, for example, in a DECT multicell system the same time slots are blocked at all synchronous base stations on the basis of the previously mentioned technical restrictions (slow hopping radio part), the disturbing signal level at these time slots is particularly low at all frequencies. For this reason, these time slots would be selected preferably before the channel selection in the mobile part, if the blind slot information is still not available.

Based on FIGS. 1 to 5, FIG. 6 shows an event-state diagram for the setup of a telecommunication connection between a base station BS, RFP and a mobile part MT, RPP with an additional item of information (blind slot information). The base station BS, RFP sends, in a time slot $ZS_{2n}$, an item of broadcast information BCI with an additional item of information (blind slot information) BSI to the mobile part MT, RPP. The additional item of information BSI for example communicates to the mobile part MT, RPP that all even time slots $ZS_{2n}$, with n ∈ {0 . . . 23} at the base station BS, RFP are able to be occupied (are free) for telecommunication connections. It results automatically from this that all odd time slots $ZS_{2n+1}$ at the base station BS, RFP are not available for telecommunication connections. In FIG. 6, the odd time slots $ZS_{2n+1}$ are shown as black boxes. However, the time slots available at the base station BS, RFP can also all be odd time slots $ZS_{2n+1}$. Likewise, the additional information BSI can alternatively give information concerning the time slots that are not available at the base station BS, RFP. The fact that at the base station BS, RFP according to FIG. 5 all odd time slots $ZS_{2n+1}$ are not available for telecommunication connections shows the mobile part MT, RPP that the base station BS, RFP is possibly a base station with a slow hopping radio part. By means of the additional information BSI, the mobile part MT, RPP can for its part mark all odd time slots $ZS_{2n+1}$ as time slots that are not to be used for the connection setup (hatched boxes in FIG. 6).

If in the following the mobile part MT, RPP wishes to set up a telecommunication connection to the base station BS, RFP, it transmits a first message "ACCESS_REQUEST" to the base station BS, RFP as a SETUP request item of information, in one of the time slots $ZS_{2n+1}$ that were communicated to it as being free, said transmission taking place according to the DECT standard (cf. ETSI publication ETS 300175-3, October 1992, ch. 10.5). After receiving this first message, the base station BS, RFP can for its part transmit further items of broadcast information BCI to the mobile part MT, RPP. The first message, sent by the mobile part MT,RPP, is responded to by the base station BS,RFP according to the DECT standard (cf. ETSI publication ETS 300175-3, October 1992, ch. 10.5) with a second message "BEARER_CONFIRM" (response information). After the transmission of the second message, according to the DECT standard further messages are exchanged between the base station BS, RFP and the mobile part MT, RPP, before the telecommunication connection desired by the mobile part MT with the base station BS, RFP is finally set up (Bearer Established).

Based on FIG. 6, FIG. 7 shows an event-state diagram for the setup of a telecommunication connection between a base station BS, RFP and a mobile part MT, RPP, without any additional information ("blind slot" information). In a time slot $ZS_{2n}$, the base station BS, RFP sends an item of broadcast information BCI to the mobile part MT, RPP, without an additional item of information (blind slot information) BSI.

The mobile part MT, RPP, which in the following wishes to set up a telecommunication connection to the base station BS, RFP, again transmits, as an item of SETUP request information, the first message "ACCESS_REQUEST" to the base station BS, RFP (first attempt at a connection setup), according to the DECT standard (cf. ETSI publication ETS 300175-3, October 1992, ch. 10.5), this transmission taking place according to a time slot selected by means of the channel selection, e.g. on the basis of the disturbing signal level. In the present case, the time slot sought by the channel selection is however an odd time slot $ZS_{2n+1}$, which is not available at the base station BS, RFP. However, alternatively it is also possible that the first message has not arrived at the base station BS, RFP, due to disturbances on the radio path. In both cases, the mobile part MT, RPP recognizes that the first attempt at setting up a connection to the base station BS, RFP has failed because it has not received the second message "BEARER_CONFIRM" from the base station BS, RFP, either intentionally (because the time slot used was an odd time slot) or unintentionally (because there was again a disturbance on the radio path).

Subsequently, the mobile part MT, RPP again transmits, according to the DECT standard (cf. ETSI publication ETS 300175-3, October 1992, ch. 10.5), the first message "ACCESS_REQUEST" to the base station BS, RFP (second attempt at a connection setup), after for example an item of broadcast information BCI has previously again been sent to the mobile part MT, RPP without an item of additional information (blind slot information) BSI, according to a time slot selected by the channel selection, e.g. on the basis of the disturbing signal level, which time slot can in some circumstances be the same as in the first attempt at a connection setup. This time slot sought by the channel selection is again also an odd time slot $ZS_{2n+1}$ not available at the base station BS, RFP. However, alternatively it is also again possible that the first message has not arrived at the base station BS, RFP due to disturbances on the radio path. In both cases, the mobile part MT, RPP again recognizes that the second attempt at setting up a connection to the base station BS, RFP has likewise failed because it has not received the second message "BEARER_CONFIRM" from the base station BS, RFP, either intentionally (because the time slot used was an odd time slot) or unintentionally (because there was again a disturbance on the radio path).

The mobile part MT, RPP thereupon undertakes a third attempt. In the present case, this also fails for the reasons indicated, so that according to FIG. 7 no connection setup takes place.

However, according to the DECT standard it is provided to allow 10 attempts for a MAC layer construction (cf. ETSI publication ETS 300175-3, October 1992, ch. 10.2, in connection with annex A.2—Konstante N200) and 15 attempts for a bearer handover (cf. ETSI publication ETS 300175-3, October 1992, ch. 10.6, in connection with annex A.2—Konstante N202).

If the number of attempts for a MAC layer construction (Type I connection setup) or, respectively, for a bearer handover (Type II connection setup) reaches the value respectively indicated above, a connection setup is not possible.

The first message is transmitted by the mobile part MT, RPP until
  a) the mobile part MT, RPP has still received no second message,
  b) the 10 attempts for an MAC layer construction or, respectively, the 15 attempts for a bearer handover have not yet been exceeded,
  c) an mth first message, sent after receipt of the additional information, has been-transmitted.

From Great Britain reference GB-2 297 014 A, a method is known for the telecommunication and handover connection setup for a portable radio telephone (mobile part) that can set up FDMA/TDMA telecommunication connections to base stations in a digital cellular radiotelephone system, in which a high-performance dynamic channel allocation algorithm is used, independent of the presence and precision of additional items of information (items of blind slot information) transmitted by the base station to the mobile part. The algorithm is essentially distinguished in that each telecommunication channel in a TDMA time slot on which an attempt of the mobile part at a telecommunication setup with the base station has failed is marked and thus excluded for further attempts at telecommunication connection setups.

SUMMARY OF THE INVENTION

The underlying object of the invention is on the one hand to set up telecommunication connections more quickly between first telecommunication apparatuses and second telecommunication apparatuses in wireless telecommunication systems, in particular between a DECT fixed part and a DECT mobile part (portable part) of a DECT system, if no items of additional information relating to the telecommunication connections to be set up are present, and on the other hand to increase the probability that a connection setup takes place at all given these conditions.

In general terms the present invention is a method for setting up telecommunication connections between first telecommunication apparatuses and second telecommunication apparatuses in wireless telecommunication systems, in particular between a DECT fixed part and a DECT mobile part of a DECT system, in which, according to a hybrid multiple access method containing the TDMA principle:
  a) additional items of information can be transmitted from the first telecommunication apparatuses to the second telecommunication apparatuses on radio channels, which items indicate that first radio channels are available for the telecommunication connections with the first telecommunication apparatuses and second radio channels are not available for this;
  b) first items of request information for a connection setup are transmitted from the second telecommunication apparatuses to the first telecommunication apparatuses on the first radio channels or the second radio channels, if the second telecommunication apparatuses have received no additional items of information;
  c) second items of request information for the connection setup are transmitted from the second telecommunication apparatuses to the first telecommunication apparatuses on the first radio channels if the second telecommunication apparatuses have received the additional items of information;
  d) items of response information are transmitted from the first telecommunication apparatuses to the second telecommunication apparatuses if the items of request information have been received on the first radio channels;
  e) the second telecommunication apparatuses transmit the first items of request information to the first telecommunication apparatuses until they have received the additional items of information, have received the items of response information, or have respectively transmitted a predetermined number n of the first items of request information.

The respective second telecommunication apparatus which has transmitted the first item of request information to the respective first telecommunication apparatus and has received no item of response information from the first telecommunication apparatus, registers the radio channel used as a third radio channel or, respectively, as third radio channels, on which channels the transmission of further first items of request information of the respective second telecommunication apparatus is excluded.

The radio channel or, respectively, channels is or, respectively, are registered as a third radio channel or, respectively, channels, by means of the storage of channel-specific identifiers.

The registered third radio channel or, respectively, channels is/are erased, and the number n is reset to the initial value of the respective second telecommunication apparatus has received the additional information, has received the response information, or has respectively transmitted a predetermined number n of the first items of request information.

The first telecommunication apparatus is a wireless base station and the second telecommunication apparatus is a wireless mobile part.

The first telecommunication apparatus and the second telecommunication apparatus are a wireless mobile part.

A TDMA time slot is allocated to the radio channel, or, respectively, TDMA time slots are allocated to the radio channels.

The items of additional information are DECT/GAP-specific items of "blind slot" information.

The first items of request information and the second items of request information if the respective second telecommunication apparatus has received the additional information, has received the response information, or has respectively transmitted a predetermined number n of the first items of request information.

The first telecommunication apparatus is a wireless base station and the second telecommunication apparatus is a wireless mobile part.

Each of the first telecommunication apparatus and the second telecommunication apparatus are a wireless mobile part.

A TDMA time slot is allocated to the radio channel, or, respectively, TDMA time slots are allocated to the radio channels.

Items of additional information are DECT/GAP-specific items of "blind slot" information.

The first items of request information and the second items of request information are DECT/GAP-specific items of information for the introduction of the setup of telecommunication connections.

The first items of request information and the second items of request information are DECT/GAP-specific items of information for the introduction of the setup of telecommunication connections, whereby the telecommunication connections to be set up are intended to replace existing telecommunication connections.

The predetermined number n of first items of request information is equal to ten.

The predetermined number n of first items of request information is equal to fifteen.

For further attempts to set up a connection, the underlying idea of the invention is essentially to mark (at least temporarily) as unusable radio channels (e.g. matrix columns or, respectively, matrix rows or matrix elements of a TDMA/FDMA matrix constructed according to a hybrid multiple access method containing the TDMA principle) that were used in failed attempts at setting up telecommunication connections between first telecommunication apparatuses and second telecommunication apparatuses in wireless telecommunication systems of the type named above, in particular between a DECT fixed part and a DECT mobile part (portable part) of a DECT system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 8:
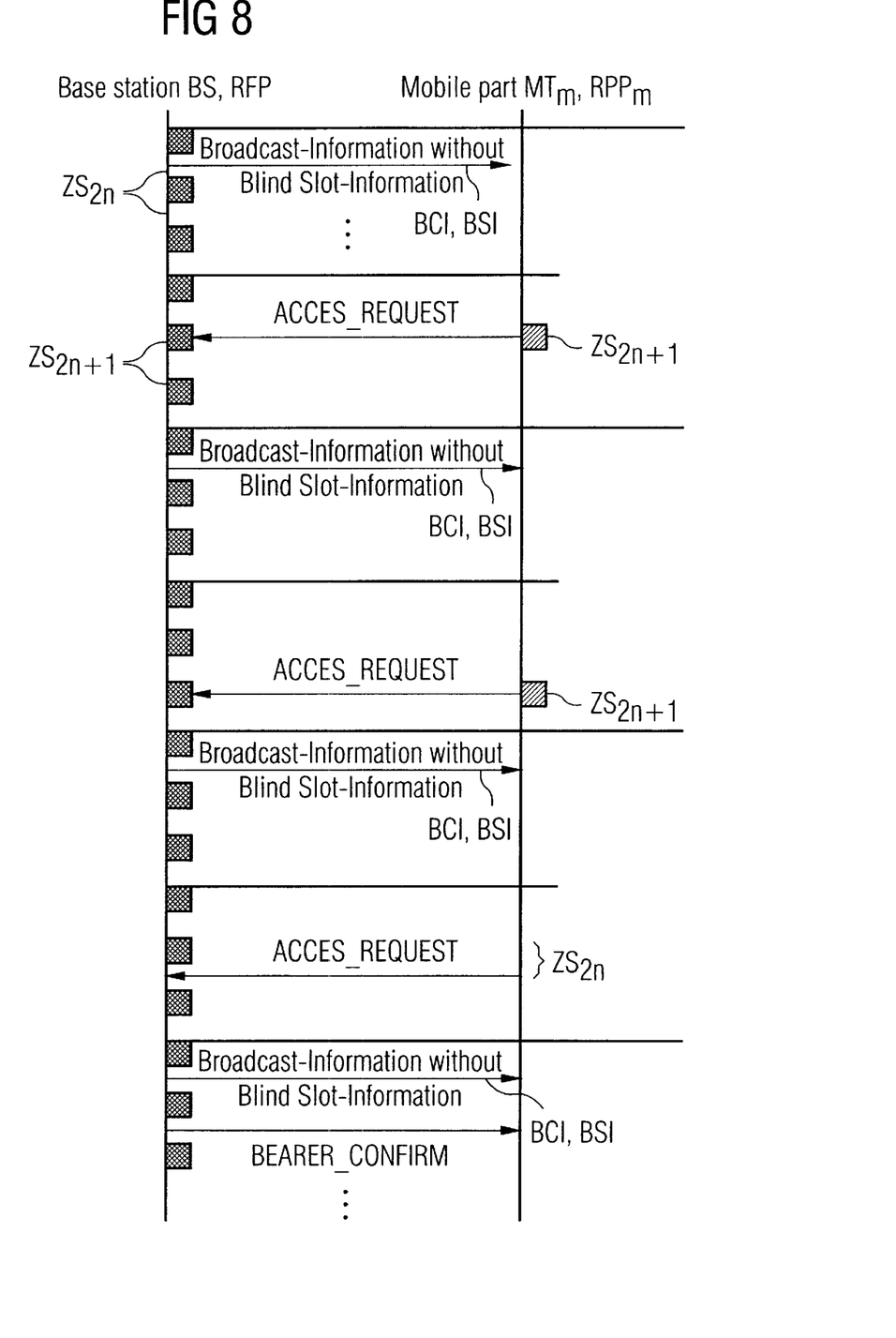
FIG. 8 depicts an event-state diagram for setting up a telecommunication connection between a base station and a mobile part according to the present invention.

FIG. 8 shows, on the basis of FIG. 7, an event-state diagram for the setting up of a telecommunication connection between a base station BS, RFP and a mobile part $MT_m$, $RPP_m$, modified in relation to the mobile part MT, RPP according to FIG. 7, without any additional information (blind slot information). In a time slot $ZS_{2n}$, the base station BS, RFP transmits an item of broadcast information BCI to the mobile part $MT_m$, $RPP_m$ without an additional item of information (blind slot information) BSI.

If in the following the mobile part $MT_m$, $RPP_m$ wishes to set up a telecommunication connection to the base station BS, RFP, it transmits (as according to FIG. 7) the first message "ACCESS_REQUEST" as an item of SETUP request information to the base station BS, RFP (first attempt at a connection setup), according to a time slot selected by the channel selection, e.g. on the basis of the disturbing signal level, in accordance with the DECT standard (cf. ETSI publication ETS 300175-3, October 1992, ch. 10.5). In the present case, the time slot sought by the channel selection is however an odd time slot $ZS_{2n+1}$, which is not available at the base station BS, RFP. Alternatively, it is again possible here as well that the first message did not arrive at the base station BS, RFP due to disturbances on the radio path. In both cases, the mobile part $MT_m$, $RPP_m$ recognizes that the first attempt at setting up a connection to the base station BS, RFP has failed because it has not received the second message "BEARER_CONFIRM" from the base station BS, RFP, either intentionally (because the time slot used was an odd time slot) or unintentionally (because there was again a disturbance on the radio path).

Before the mobile part $MT_m$, $RPP_m$ begins a further attempt, it marks as an unavailable time slot, like the odd time slots $ZS_{2n+1}$, the time slot at which it previously made the failed attempt the first time at setting up a connection to the base station BS, RFP. In FIG. 8, this unavailable time slot is again shown as a hatched box. The marking takes place because in this way the mobile part $MT_m$, $RPP_m$, in contrast to the ratios according to FIG. 7, purposely reduces the number of time slots possible for the connection setup, and thereby (in particular on the basis of the danger, addressed in the specification of FIG. 7, that the same time slot is always used due to the disturbing signal level evaluation in the channel or, respectively, time slot selection) increases the probability that a connection will result in further attempts.

Subsequently, the mobile part $MT_m$, $RPP_m$ again transmits, according to the DECT standard (cf. ETSI publication ETS 300175-3, October 1992, ch. 10.5), the first message "ACCESS_REQUEST" to the base station BS, RFP (second attempt at a connection setup), after for example an item of broadcast information BCI has previously again been sent to the mobile part $MT_m$, $RPP_m$ without an item of additional information (blind slot information) BSI, according to a time slot selected by the channel selection, e.g. on the basis of the disturbing signal level, which time slot can in some circumstances be the same as in the first attempt at a connection setup. This time slot sought by the channel selection is again also an odd time slot $ZS_{2n+1}$ not available at the base station BS, RFP. However, alternatively it is also again possible that the first message has not arrived at the base station BS, RFP due to disturbances on the radio path. In both cases, the mobile part $MT_m$, $RPP_m$ again recognizes that the second attempt at setting up a connection to the base station BS, RFP has likewise failed because it has not received the second message "BEARER_CONFIRM" from the base station BS, RFP, either intentionally (because the time slot used was an odd time slot) or unintentionally (because there was again a disturbance on the radio path).

Before the mobile part $MT_m$, $RPP_m$ begins a further attempt, it also marks this time slot, on which it previously made a second failed attempt to set up a connection to the base station BS, RFP, as an unavailable time slot, like the odd time slots $ZS_{2n+1}$. In FIG. 8, this unavailable time slot is again shown as a hatched box. By means of this new marking, the number of possible time slots for the connection setup is again purposely reduced, and by this means (in particular on the basis of the danger, addressed in the specification of FIG. 7, that the same time slot is always used due to the disturbing signal level evaluation in the channel or, respectively, time slot selection) increases the probability that a connection will result in further attempts.

The mobile part $MT_m$, $RPP_m$ thereupon begins a third attempt. In the present case, this attempt is successful. This time, the mobile part $MT_m$, $RPP_m$ has obtained an even time slot $ZS_{2n}$ that can be occupied (is free) for the setting up of telecommunication connections with the base station BS, RFP. However, the mobile part $MT_m$, $RPP_m$ does not obtain certainty about this until it has received the second message "BEARER_CONFIRM." Before the receipt of this message, the mobile part $MT_m$, $RPP_m$ can (as shown in FIG. 8) receive for example another item of broadcast information BCI without an additional item of information.

The first message is transmitted by the mobile part $MT_m$, $RPP_m$ until
  a) the mobile part $MT_m$, $RPP_m$ has still received no second message,
  b) the 10 attempts for a MAC layer construction or, respectively, the 15 attempts for a bearer handover have not yet been exceeded,
  c) an mth first message, sent after receipt of the additional information, has been transmitted.

The marking of the time slots (radio channels) preferably takes place by means of the storage of channel-specific identifiers.

The marking of the time slots (radio channels) is erased and the number n of attempts for the connection setup is reset to the initial value if the mobile part $MT_m$, $RPP_m$
  (i) has received the additional item of information BSI,
  (ii) has received the second message "BEARER_CONFIRM," or
  (iii) has respectively transmitted a predetermined number n of the first messages "ACCESS_REQUEST."

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for setting up telecommunication connections between first telecommunication apparatuses and second telecommunication apparatuses in wireless telecommunication systems, using a hybrid multiple access method having a TDMA principle, comprising the steps of:
  transmitting additional items of information from the first telecommunication apparatuses to the second telecommunication apparatuses on radio channels, which items indicate that first radio channels are available for the telecommunication connections with the first telecommunication apparatuses and which items indicate second radio channels are not available;
  transmitting first items of request information for a connection setup from the second telecommunication apparatuses to the first telecommunication apparatuses on one of the first radio channels or the second radio channels, if the second telecommunication apparatuses have received no additional items of information;
  transmitting second items of request information for the connection setup from the second telecommunication apparatuses to the first telecommunication apparatuses on the first radio channels if the second telecommunication apparatuses have received the additional items of information;
  transmitting items of response information from the first telecommunication apparatuses to the second telecommunication apparatuses if the items of request information have been received on the first radio channels;
  transmitting from the second telecommunication apparatuses the first items of request information to the first telecommunication apparatuses until the second telecommunication apparatuses:
    have received the additional items of information,
    have received the items of response information, or
    have respectively transmitted a predetermined number n of the first items of request information;
  registering by a respective second telecommunication apparatus, which has transmitted the first item of request information to a respective first telecommunication apparatus and which has received no item of response information from the first telecommunication apparatus, the radio channel used as a third radio channel or, respectively, as third radio channels, on which third channel, or respectively third channels transmission of further first items of request information of the respective second telecommunication apparatus is excluded.

2. The method according to claim 1, wherein the radio channel or, respectively, channels is or, respectively, are registered as a third radio channel or, respectively, channels, by storage of channel-specific identifiers.

3. The method according to claim 2, wherein the registered third radio channel or, respectively, channels is/are erased, and wherein the number n is reset to the initial value if the respective second telecommunication apparatus
  (i) has received the additional information,
  (ii) has received the response information, or
  (iii) has respectively transmitted the predetermined number n of the first items of request information.

4. The method according to claim 1, wherein the first telecommunication apparatus is a wireless base station and the second telecommunication apparatus is a wireless mobile part.

5. The method according to claim 1, wherein each of the first telecommunication apparatus and the second telecommunication apparatus are a wireless mobile part.

6. The method according to claim 1, wherein a TDMA time slot is allocated to the radio channel, or, respectively, TDMA time slots are allocated to the radio channels.

7. The method according to claim 6, wherein the items of additional information (BSI, BCI) are DECT/GAP-specific items of "blind slot" information.

8. The method according to claim 1, wherein the first items of request information and the second items of request information are DECT/GAP-specific items of information for introducing setup of telecommunication connections.

9. The method according to claim 1, wherein the first items of request information and the second items of request information are DECT/GAP-specific items of information for introducing setup of telecommunication connections, whereby the telecommunication connections to be set up replace existing telecommunication connections.

10. The method according to claim 8, wherein the predetermined number n of first items of request information is equal to ten.

11. The method according to claim 9, wherein the predetermined number n of first items of request information is equal to fifteen.

12. The method according to claim 1, wherein the first telecommunication apparatuses are DECT fixed parts and wherein the second telecommunications apparatuses are DECT mobile parts.

* * * * *